United States Patent
Dai et al.

(10) Patent No.: US 7,543,222 B2
(45) Date of Patent: Jun. 2, 2009

(54) SYSTEM AND METHOD FOR CHECKING BIOS ROM DATA

(75) Inventors: Liang-Yan Dai, ShenZhen (CN); Jian-Jun Zhu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 574 days.

(21) Appl. No.: 11/249,301

(22) Filed: Oct. 13, 2005

(65) Prior Publication Data

US 2006/0107162 A1 May 18, 2006

(30) Foreign Application Priority Data

Oct. 15, 2004 (TW) .............................. 93131358 A

(51) Int. Cl.
*G06F 7/02* (2006.01)
(52) U.S. Cl. .................. 714/819; 714/824; 714/807
(58) Field of Classification Search ................. 714/819, 714/824, 798, 803, 807; 710/8, 10
See application file for complete search history.

(56) References Cited

U.S. PATENT DOCUMENTS

| 5,802,393 | A | * | 9/1998 | Begun et al. | 710/10 |
| 5,974,554 | A | * | 10/1999 | Oh | 713/300 |
| 6,442,623 | B1 | * | 8/2002 | Kim | 710/8 |
| 6,715,106 | B1 | | 3/2004 | Mermelstein | 714/36 |
| 7,003,655 | B2 | * | 2/2006 | Wang et al. | 713/1 |

FOREIGN PATENT DOCUMENTS

| CN | 1201536 A | 12/1998 |
| CN | 1258885 A | 7/2000 |
| CN | 1449515 A | 10/2003 |

* cited by examiner

*Primary Examiner*—Esaw T Abraham
*Assistant Examiner*—Fritz Alphonse

(57) ABSTRACT

A system for checking basic input output system read only memory (BIOS ROM) data includes a keyboard, a display, a computer host, and a checking device. The computer host has a BIOS ROM installed therein. The checking device includes: a data dividing module for dividing the BIOS ROM data into a plurality of sections; a data obtaining module for capturing BIOS ROM data from one or more sections, and for counting a check datum; a data checking module for comparing the check datum with a standard datum, and for determining whether the two data are equal; and a checking result outputting module for outputting the checking results.

10 Claims, 3 Drawing Sheets

SYSTEM AND METHOD FOR CHECKING BIOS ROM DATA

BACKGROUND OF THE INVENTION

1. Field of the Invention

The present invention relates to a system and method for checking BIOS ROM data.

2. General Background

Usually, there is a basic input output system read only memory (BIOS ROM) on a computer main-board, in order to communicate hardware with software in a computer system. By executing a program stored in the BIOS ROM, users can check the performance of the central processing unit (CPU), drive a floppy disk or a hard disk, load an operation system, and so on. Both a notebook computer and a desk computer must execute a BIOS program correctly, in order to startup the computer successfully and accomplish initialization.

Generally, a computer main-board needs to be checked before leaving a factory. For checking a BIOS ROM, there is a conventional method using a special neilsbed contacted to elements of the BIOS ROM and hundreds of milliampere electricity to check discretely. By using the conventional method, data stored in the BIOS ROM can be captured. Users compare the captured data with preset standard data, and determine if the BIOS ROM data are broken.

However, as the circuit of a main-board becomes more and more complicated, the conventional method must increase contact-points accordingly. This results in higher costs and time-consuming in checking the BIOS ROM.

Therefore, what is needed is a system and method for checking BIOS ROM data, by which the users can easily check the BIOS ROM data.

SUMMARY

A system for checking BIOS ROM data in accordance with a preferred embodiment of the present invention includes: an input device for inputting a parameter as a standard datum which can be used for the checking process; and a checking device for checking the BIOS ROM data. The checking device includes: a data dividing module for dividing the BIOS ROM data into a plurality of sections; a data obtaining module for capturing BIOS ROM data from one or more sections, and for counting a check datum; and a data checking module for comparing the check datum with the standard datum, and for determining whether the two data are equal.

Further, a preferred method for checking BIOS ROM data is provided. The method includes the steps of: inputting a parameter acting as a standard datum; dividing the BIOS ROM data into a plurality of sections; capturing BIOS ROM data from one of the plurality of sections; generating a check digit; capturing BIOS ROM data from another one of the plurality of sections; generating another check digit and counting a check sum; determining if all the BIOS ROM data of the plurality of sections have been captured; transforming the check sum to a check datum; if all the BIOS ROM data of the plurality of sections have been captured; comparing the check datum to the standard datum and determining if the two data are equal; outputting a checking result indicating that the checked BIOS ROM data are unbroken if the two data are equal; and displaying the checking result.

Other advantages and novel features of the present invention will be drawn from the following detailed description of a preferred embodiment and preferred method with the attached drawings, in which:

DETAILED DESCRIPTION OF THE PREFERRED EMBODIMENTS

Figure 1:
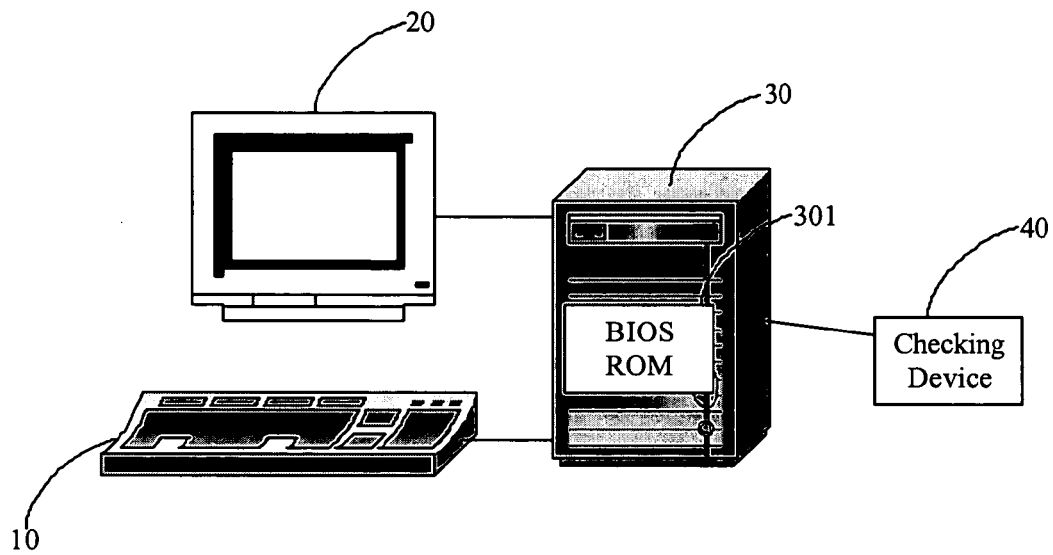
FIG. 1 is a schematic diagram of hardware configuration of a system for checking BIOS ROM data in accordance with a preferred embodiment of the present invention.

FIG. 1 is a schematic diagram of hardware configuration of a system for checking BIOS ROM data (hereinafter, "the system") in accordance with a preferred embodiment of the present invention. The system includes an input device such as a keyboard 10, an output device such as a display 20, a computer host 30, and a checking device 40. Wherein, the keyboard 10 is connected to the computer host 30, for inputting a parameter which can be used for the checking process. The display 20 is also connected to the computer host 30, for providing an interface for displaying checking results. The computer host 30 has a BIOS ROM 301 installed therein, which stores the BIOS ROM data. The checking device 40 is connected to the computer host 30, and checks the BIOS ROM data. The checking device 40 has software installed therein, and may be a floppy disk, a compact disc, or any other suitable storage device.

Figure 2:
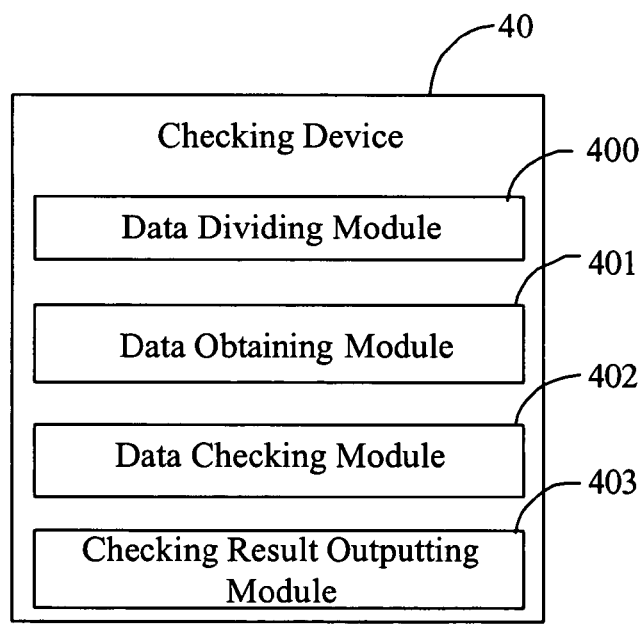
FIG. 2 is a schematic diagram showing function modules of the checking device of the system of FIG. 1.

FIG. 2 is a schematic diagram showing function modules of the checking device 40. The checking device 40 includes a data dividing module 400, a data obtaining module 401, a data checking module 402, and a checking result outputting module 403. Wherein, the data dividing module 400 divides the BIOS ROM data into a plurality of sections. The data obtaining module 401 captures BIOS ROM data from one or more of the sections, and counts a check datum. The check datum is transformed from a check sum, which will be described in detail with reference to FIG. 4. The data checking module 402 compares the check datum with a standard BIOS ROM datum, and determines whether the two data are equal. If the two data are equal, the checked BIOS ROM data are unbroken. If the two data are not equal, the checked BIOS ROM data are broken. The checking result outputting module 403 is for outputting the checking results.

Figure 3:
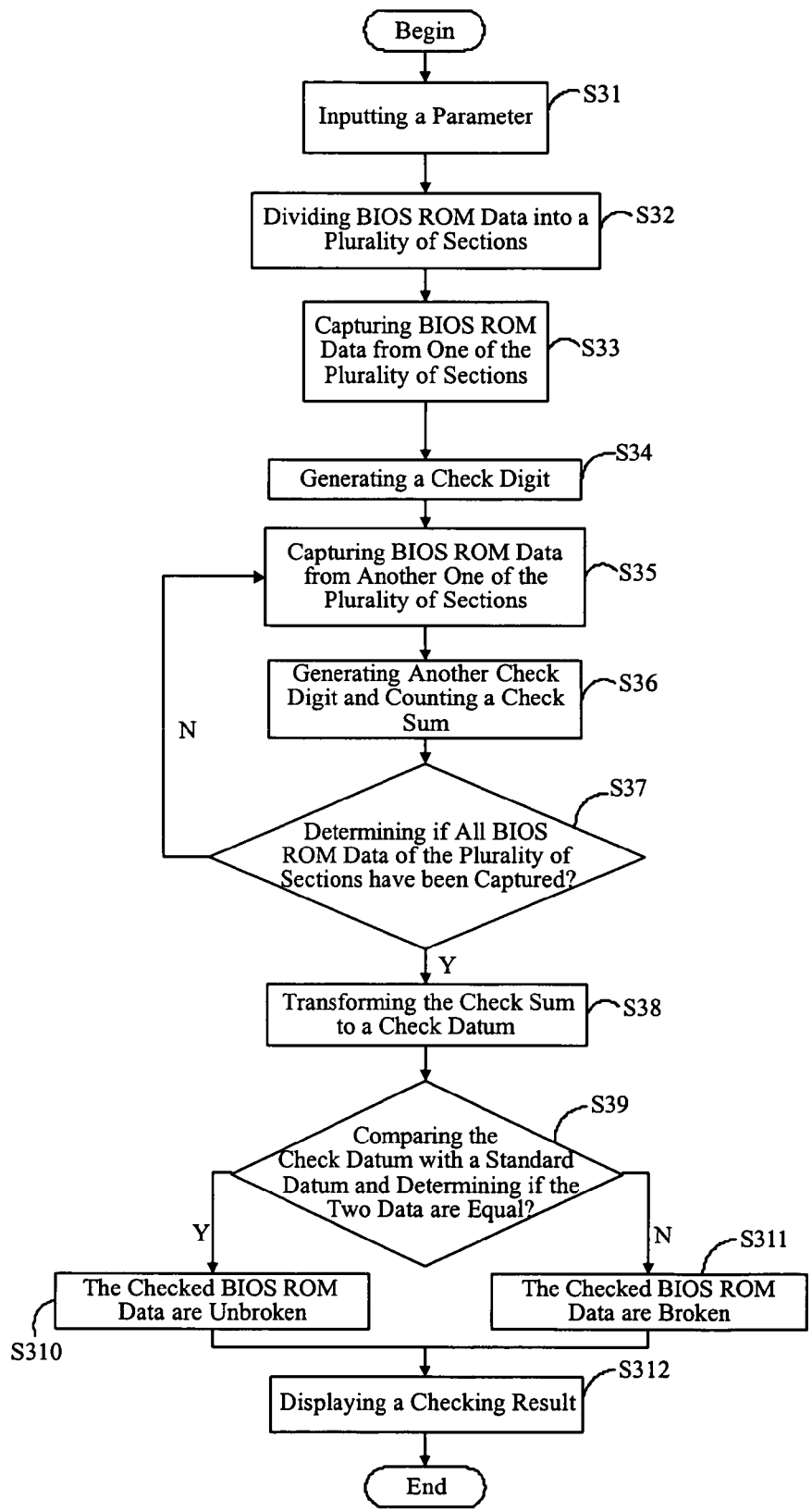
FIG. 3 is flowchart of a preferred method for checking BIOS ROM data by utilizing the system of FIG. 1.

FIG. 3 is a flowchart of a preferred method for checking BIOS ROM data. In step S31, a user inputs a parameter which is used for the checking process through the keyboard 10. The parameter is a standard datum, which is obtained by calculating standard unbroken BIOS ROM data digit by digit and can be used to compare with a check datum. In step S32, the data dividing module 400 divides the BIOS ROM data to a plurality of sections. In step S33, the data obtaining module 401 captures BIOS ROM data from one of the plurality of sections. The data obtaining module 401 may capture the BIOS ROM data from the first section, and may also capture the BIOS ROM data from the last section. All the sections are arranged according to address sequences of the BIOS ROM data. In step S34, the data obtaining module 401 generates a check digit according to the captured BIOS ROM data, which will be described in detail with reference to FIG. 4. In step S35, the data obtaining module 401 captures BIOS ROM data from another one of the plurality of sections. In step S36, the data obtaining module 401 generates another check digit, and counts a check sum, which will also be described in detail with reference to FIG. 4. In step S37, the data obtaining module 401 determines if all the BIOS ROM data of the plurality of sections have been captured. If there are BIOS ROM data of any section that have not been captured, the procedure returns to step S35 described above. Otherwise, if all the BIOS ROM data of the plurality of sections have been captured, in step S38, the data obtaining module 401 transforms the check sum to a check datum. In step S39, the data checking module 402 compares the check datum with the standard datum, and determines if the two data are equal. If the two data are equal, in step S310, the checking result outputting module 403 outputs a checking result indicating that the checked BIOS ROM data are unbroken,. Otherwise, if the two data are not equal, in step S311, the checking result outputting module 403 outputs a checking result indicating that the checked BIOS ROM data are broken. In step S312, the display 20 displays the checking result.

Figure 4:
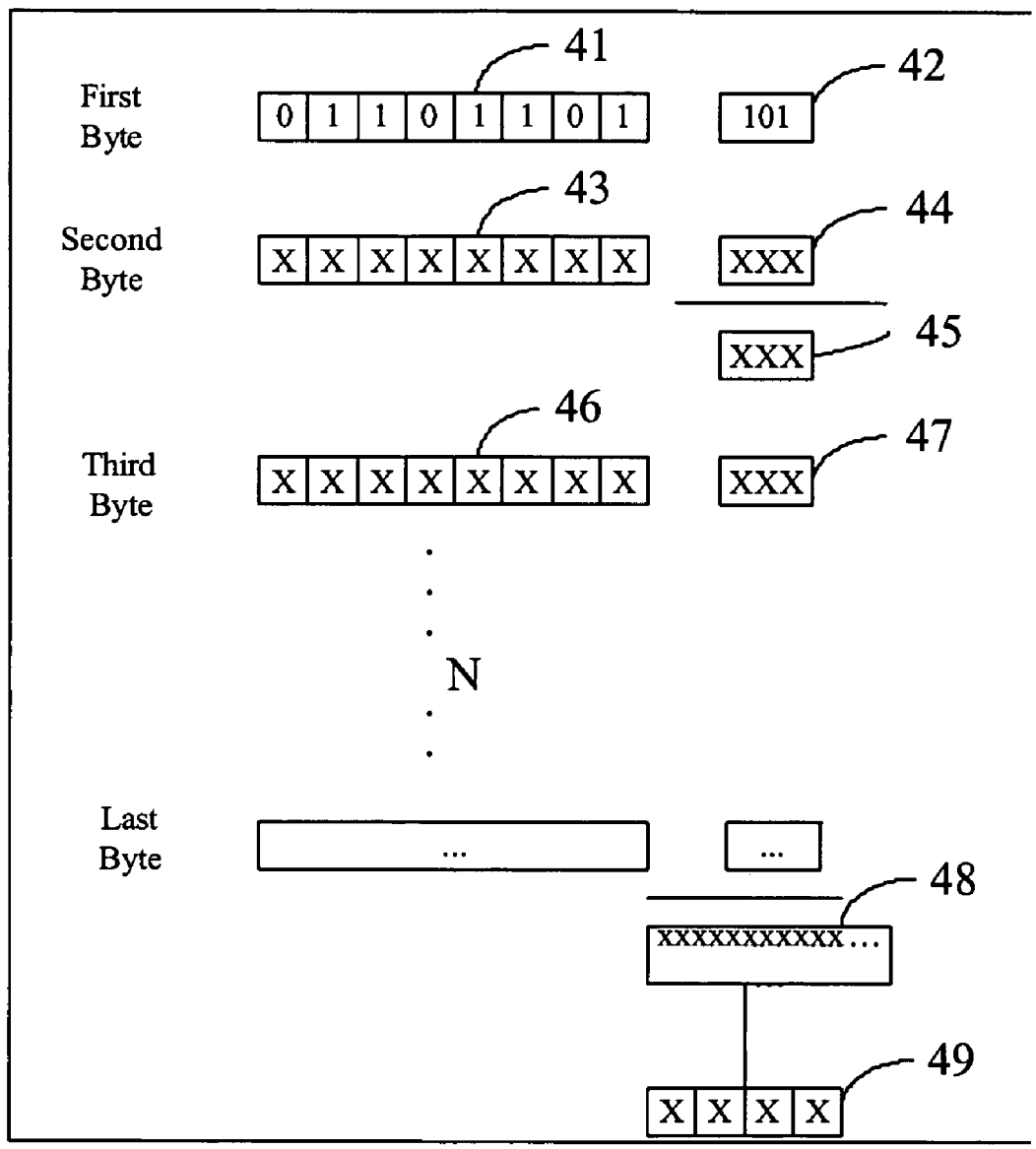
FIG. 4 is schematic diagram showing a preferred method for generating a check digit and counting a check sum.

FIG. 4 is schematic diagram showing a method for generating a check digit and counting a check sum. In this detailed description, the data dividing module 400 first divides the BIOS ROM data into a plurality of sections. It is assumed that each section has a size of one byte, and the BIOS ROM data are divided into a plurality of bytes. Because each byte has 8 bits, it is further assumed that a value of the first byte 41 is "01101101". According to the addition arithmetic of the binary system, a sum of 1 and 1 is "10" (1+1=10), and a sum of 1 and 0 is "1" (1+0=1). The data obtaining module 401 then generates a check digit 42 by calculating a sum of all bits of the first byte 41, namely, "0+1+1+0+1+1+0+1," which is "101." By the same way, values of all bits of the second byte 43 are added, and a check digit 44 is obtained. Then, the data obtaining module 401 adds the check digit 42 to the check digit 44, and obtains a check sum 45. Then, values of bits of the third byte 46 are added, and a check digit 47 is generated. The data obtaining module 401 adds the check digit 47 to the check sum 45 to obtain a new check sum. By adding values of all bits of the sections of the BIOS ROM data, the data obtaining module 401 generates a check sum 48. Finally, the data obtaining module 401 transforms the check sum 48 to a check datum 49.

Although the present invention has been specifically described on the basis of a preferred embodiment and preferred method, the invention is not to be construed as being limited thereto. Various changes or modifications may be made to the embodiment and method without departing from the scope and spirit of the invention.

We claim:

1. A system for checking basic input output system read only memory (BIOS ROM) data, the system comprising:
   an input device for inputting a parameter as a standard datum that is in a predetermined format; and
   a checking device for checking the BIOS ROM data, the checking device comprising:
   a data dividing module for dividing the BIOS ROM into a plurality of sections;
   a data obtaining module for capturing BIOS ROM data from one or more sections, for generating a check digit for the BIOS ROM data captured from each of the plurality of sections, for counting all generated check digits to obtain a check sum, and for transforming a format of the check sum to the predetermined format so as to obtain a check datum;
   a data checking module for comparing the check datum with the standard datum, and for determining whether the two data are equal; and
   a checking result outputting module for generating checking results that indicate the BIOS ROM data to be checked are unbroken or broken.

2. The system according to claim 1, further comprising an output device for providing an interface for displaying the checking results.

3. The system according to claim 1, wherein the checking result outputting module is further configured for outputting the checking results.

4. A computer-based method for checking basic input output system read only memory (BIOS ROM) data, the method comprising the steps of:

inputting a parameter acting as a standard datum that is in a predetermined format;
dividing the BIOS ROM into a plurality of sections;
capturing BIOS ROM data from one of the plurality of sections;
generating a check digit for the BIOS ROM data captured from the one of the plurality of sections;
capturing BIOS ROM data from another one of the plurality of sections;
generating another check digit for the BIOS ROM data captured from the another one of the plurality of sections, and counting all generated check digits to obtain a check sum;
determining if all the BIOS ROM data of the plurality of sections have been captured;
transforming a format of the check sum to the predetermined format so as to obtain a check datum, if all the BIOS ROM data of the plurality of sections have been captured;
comparing the check datum to the standard datum and determining if the two data are equal;
outputting a checking result indicating that the BIOS ROM data to be checked are unbroken if the two data are equal; and
displaying the checking result.

5. The method according to claim 4, further comprising the step of:
returning to the step of capturing BIOS ROM data from another one of the plurality of sections if there are BIOS ROM data of any section that have not been captured.

6. The method according to claim 4, further comprising the step of outputting a checking result indicating that the checked BIOS ROM data are broken if the two data are not equal.

7. A method for verifying data in a data storage system, comprising the steps of:
retrieving a user-input parameter representing standard data to be normally stored in a data storage system;
dividing said data storage system into a plurality of recognizable sections;
retrieving stored data from each of said plurality of sections;
generating a check digit for said retrieved data captured from each of said plurality of sections, and counting all generated check digits to obtain a check sum;
transforming a format of the check sum to the format of said parameter so as to obtain a check datum;
verifying said check datum according to said parameter; and
presenting a check result based on verification of said check datum.

8. The method according to claim 7, wherein said data storage system is a basic input output system read only memory (BIOS ROM).

9. The method according to claim 7, wherein a size of said each of said plurality of sections divided from said data storage system is a byte.

10. The method according to claim 7, wherein said check sum is a sum of check digits each of which is calculated by adding binary data retrieved from said each of said plurality of sections.

* * * * *